US012570015B2

(12) United States Patent
Neyer et al.

(10) Patent No.: US 12,570,015 B2
(45) Date of Patent: Mar. 10, 2026

(54) PERSONAL CARE DEVICE

(71) Applicant: Braun GmbH, Kronberg (DE)

(72) Inventors: Christian Neyer, Eschborn (DE); Marvin Thorsten Knorr, Hochheim am Main (DE); Thomas Verstege, Frankfurt am Main (DE); Martin Fuellgrabe, Bad Camberg (DE)

(73) Assignee: Braun GMBH, Kronberg (DE)

(*) Notice: Subject to any disclaimer, the term of this patent is extended or adjusted under 35 U.S.C. 154(b) by 164 days.

(21) Appl. No.: 17/875,489

(22) Filed: Jul. 28, 2022

(65) Prior Publication Data

US 2023/0031671 A1 Feb. 2, 2023

(51) Int. Cl.
*B26B 19/38* (2006.01)
*B26B 19/06* (2006.01)

(52) U.S. Cl.
CPC .......... *B26B 19/388* (2013.01); *B26B 19/063* (2013.01)

(58) Field of Classification Search
CPC ... B26B 19/3873; B26B 19/388; B26B 19/06; B26B 19/063
See application file for complete search history.

(56) References Cited

U.S. PATENT DOCUMENTS 5,687,481 A 11/1997 De Boer et al.
7,832,104 B2 * 11/2010 Yamasaki ............... B26B 19/10 30/346.51
8,661,269 B2 2/2014 Ogashiwa
8,745,883 B2 6/2014 Murgida et al.
8,978,258 B2 3/2015 Patel et al.
9,666,394 B2 5/2017 Kamiyama et al.
10,596,714 B2 3/2020 Peter et al.
11,027,442 B2 6/2021 Fuellgrabe et al.
11,097,437 B2 * 8/2021 Fuerst ................... B26B 19/046
11,298,839 B2 * 4/2022 Fuerst ................... B26B 19/388
12,090,674 B2 9/2024 Petrelli
2004/0231160 A1 * 11/2004 Shiba .................... B26B 19/046 30/531

(Continued)

FOREIGN PATENT DOCUMENTS

DE 19601780 C1 6/1997
EP 0302268 A2 2/1989

(Continued)

OTHER PUBLICATIONS

All Office Actions; U.S. Appl. No. 17/875,498, filed Jul. 28, 2022.

(Continued)

*Primary Examiner* — Adam J Eiseman
*Assistant Examiner* — Richard D Crosby, Jr.
(74) *Attorney, Agent, or Firm* — Gerd Zetterer

(57) ABSTRACT

The present invention is a personal care device comprising an elongated handle for manually moving the personal care device along a body surface, a working head attached to the handle for effecting a personal care treatment to the body surface, wherein an adjustment device including at least one adjustment actuator is provided for adjusting at least one treatment characteristic, wherein the adjustment actuator is configured and controlled to adjust the at least one treatment characteristic from a first setting to a second setting within a transition time period of not less than 0.1 seconds and not more than 1.5 seconds.

20 Claims, 8 Drawing Sheets

(56) References Cited

U.S. PATENT DOCUMENTS

| | | | | |
|---|---|---|---|---|
| 2008/0034591 | A1* | 2/2008 | Fung | B26B 19/3866 30/529 |
| 2008/0163495 | A1 | 7/2008 | Smal | |
| 2009/0000126 | A1* | 1/2009 | Kraus | B26B 19/063 30/45 |
| 2011/0197726 | A1 | 8/2011 | Kraus | |
| 2012/0260509 | A1 | 10/2012 | Fang et al. | |
| 2013/0025078 | A1* | 1/2013 | Heil | A61C 17/221 15/22.1 |
| 2015/0197016 | A1* | 7/2015 | Krenik | B26B 21/4081 83/13 |
| 2015/0246454 | A1 | 9/2015 | Mintz et al. | |
| 2017/0291319 | A1* | 10/2017 | Hendriks | B26B 21/443 |
| 2018/0243929 | A1* | 8/2018 | Takechi | A45D 1/00 |
| 2019/0299432 | A1* | 10/2019 | Fuerst | B26B 19/10 |
| 2019/0299435 | A1* | 10/2019 | Fuellgrabe | B26B 19/3886 |
| 2019/0299436 | A1* | 10/2019 | Fuellgrabe | B26B 19/282 |
| 2019/0299437 | A1* | 10/2019 | Fuellgrabe | B26B 19/48 |
| 2019/0306259 | A1 | 10/2019 | Burghardt et al. | |
| 2024/0157588 | A1 | 5/2024 | Okawa et al. | |

FOREIGN PATENT DOCUMENTS

| | | | |
|---|---|---|---|
| EP | 2208587 | A1 | 7/2010 |
| EP | 2208588 | A1 | 7/2010 |
| EP | 3546149 | A1 | 10/2019 |
| EP | 3546152 | A1 | 10/2019 |
| EP | 3546153 | A1 | 10/2019 |
| JP | 2002311114 | A | 10/2002 |
| JP | 2004316797 | A | 11/2004 |
| JP | 2008224001 | A | 9/2008 |
| JP | 2010227224 | A | 10/2010 |
| JP | 2011211606 | A | 10/2011 |
| JP | 2014001643 | A | 1/2014 |
| JP | 2014067157 | A | 4/2014 |
| JP | 2016077464 | A | 5/2016 |
| WO | 9707943 | A1 | 3/1997 |
| WO | 2013140309 | A1 | 9/2013 |
| WO | 2015135682 | A1 | 9/2015 |
| WO | 2016046142 | A1 | 3/2016 |
| WO | 2017220352 | A1 | 12/2017 |
| WO | 2018069265 | A1 | 4/2018 |

OTHER PUBLICATIONS

Extended EP Search Report and Search Opinion for 21188505.8 dated Apr. 22, 2022, 20 pages.

Unpublished U.S. Appl. No. 17/875,498, filed Jul. 28, 2022 to Marvin Thorsten Knorr et al.

* cited by examiner

PERSONAL CARE DEVICE

FIELD OF THE INVENTION

The present invention relates to a personal care device, in particular hair removal device such as an electric shaver, comprising an elongated handle for manually moving the personal care device along a body surface, a working head attached to said handle for effecting a personal care treatment to said body surface, wherein an adjustment device including at least one adjustment actuator is provided for adjusting a treatment characteristic of said personal care device such as the adaptivity of the working head.

BACKGROUND OF THE INVENTION

Personal care devices are widely used to apply different types of personal care treatments to users, wherein such personal care devices may include hair removal devices such as epilators, shavers or razors which may be electric or manual and/or wet or dry, or beard trimmers. Furthermore, other personal care devices include dental care appliances such as electric or manual tooth brushes, interdental cleaners or gum massaging devices, or skin treatment devices such as massaging devices or vibrators. All such personal care devices are subject to the problem that different users use the personal care devices in different ways and different users have different preferences for the mechanical settings of the personal care device.

In a more general context, some users tend to rather strongly press the working head against the body surface to be treated, whereas other users apply rather slight pressure. Some users tend to move the working head over the body surface at rather fast speeds in rather short strokes, whereas other users apply slower speeds and longer strokes. Depending on the user habits and preferences, the working head should provide for a softer or more controllable or stiffer user feeling what requires different movability characteristics of the suspension allowing for movements of the working head relative to the handle and/or movements of the working head element relative to the working head base.

Changing the movability characteristics also may be desirable for the same user when using the personal care device in different treatment modes, in different shaving situations or at different body portions. For example, when shaving the upper lip region below the nose, short strokes are made and more control is desired so working head stiffness should be increased, whereas shaving the cheeks or the region around the adam's apple may require less stiffness and/or a wider pivoting/swiveling range to achieve better contour adaption.

To allow for contour adaptions, i.e. adaption of a skin contact surface of the working head to the contour of the body portion to be treated, the suspension of the working head relative to the handle and/or the suspension of the working head element relative to a working head base may allow for various types of movements of the working head and the working head element, respectively, such as rotatory movements and/or linear movements thereof. More particularly, the working head may tilt and/or swivel relative to the elongated handle, wherein a tilt axis and a swivel axis may extend substantially parallel to the skin contact surface of the working head and transverse to each other. In addition or in the alternative, the working head may dive or float relative to the handle along a diving axis substantially perpendicular to the skin contact surface and/or substantially parallel to the longitudinal axis of the handle. Similarly, a working head element such as a shear foil cartridge of a shaver may tilt and/or swivel and/or dive relative to the working head frame or working head base to allow adaption to the skin contour.

So as to meet different users' habits and preferences, the suspension of the working head and/or the suspension of the working head element relative to the working head base may be adjusted to change the characteristics of the adjusting movements of the working head and/or the working head element. For example, the tilting and/or swiveling and/or diving stiffness may be increased or decreased to provide for a more controllable/stiffer (or aggressive) or a softer characteristic of the adjustment movements. Furthermore, also the tilting and/or swiveling and/or diving range in terms of the maximum rotatory and/or linear displacement may be varied.

For example, EP 3 546 153 B1 shows an electric shaver having a pivotable suspension of its working head to allow for pivoting of the working head relative to the handle and a diving suspension of the shear foil cartridge to allow for diving of the shear foil cartridge relative to the working head frame. The pivoting stiffness of the working head and the diving stiffness of the shear foil cartridge are controlled by means of mechanical springs which can be adjusted by means of actuators so as to increase and decrease pivoting stiffness and diving stiffness in terms of the torque and force necessary to achieve a certain pivot angle and a certain diving displacement. Moreover, the adjustment mechanism is configured to adjust the angular pivoting range of the working head to allow a larger or smaller maximum angular displacement.

A similar adjustability of the working head of an electric shaver is shown by document EP 35 46 152 B1.

Another option of adjusting the treatment characteristic is adjustment of the cutting length of a hair trimmer, wherein for example document WO 2018/069265 A1 discloses a hair trimmer including an adjustment actuator for adjusting the cutting length of the trimmer.

SUMMARY OF THE INVENTION

It is an objective underlying the present invention to provide for an improved personal care device avoiding at least one of the disadvantages of the prior art and/or further developing the existing solutions. A more particular objective underlying the invention is to provide for an improved adjustment of the personal care device to the user and varying use situations.

Another objective underlying the invention is to achieve self-adaption of the personal care device to the user's habits and preferences and/or to the treatment conditions in a way comfortable to the user and, at the same time, efficiently improving the treatment process.

A further objective underlying the invention is to provide for an improved personal care device quickly achieving adaption to varying body surface contours and treatment regions without irritating the user.

A still further objective underlying the invention is to achieve efficient self-adjusting with reduced energy consumption and a light-weight structure to improve handling of the personal care device due to less weight to be handled.

To achieve at least one of the aforementioned objectives, it is suggested to provide for an adjustment actuator which is configured and controlled to achieve a smooth transition between different settings of the treatment characteristics. More particularly, the adjustment actuator may be configured and controlled to adjust the treatment characteristic from a first setting to a second setting within a time period of not less than 0.1 seconds and not more than 1.5 seconds. Advantageously, the adjustment actuator may be configured and controlled to achieve transition between the two settings within a time period of not less than 0.15 seconds and not more than 0.5 seconds or a transition time period of not less than 0.15 seconds and not more than 0.25 seconds.

The above objective is also achieved by a personal care device, in particular hair removal device such as an electric shaver, comprising an elongated handle for manually moving the personal care device along a body surface, a working head attached to said handle, said working head having at least one working head element for effecting a personal care treatment to said body surface, wherein an adjustment device including at least one adjustment actuator is provided for adjusting at least one treatment characteristic.

To achieve the desired smooth transitions between different settings of the treatment characteristics, the adjustment actuator is operated with a limited change rate so the transition from one state such as "soft" to another one such as "hard" happens within a well-defined time duration. On the one hand, transition should not be too fast because immediate changes could disturb the user or could be considered as uncomfortable to the user experience. On the other hand, the transition should be fast enough to arrive at the desired setting of the treatment characteristic in response to variations of the treatment region and/or variations of the way of using the personal care device such as changing from short strokes to long strokes.

When the personal care device is moved along the body surface in a reciprocating way, the adjustment actuator may be configured and controlled to effect the transition from a first setting to a second setting of the treatment characteristics within a transition time not exceeding the time spent for one or two strokes.

The adjustment actuator may be configured to allow operation at different speeds, wherein a control unit for controlling the adjustment actuator may be configured to vary the transition time spent for effecting the adjustment, i.e. transition from a first setting to a second setting depending on user habits and/or preferences and/or operational situations. For example, when changing from long stroke use to short stroke use, it may be advantageous to effect transition from, for example, a softer working head configuration to a harder working head configuration within a shorter transition time of, for example, 0.15 to 0.20 seconds, whereas, on the other hand, it may be advantageous to effect transition from the harder setting to the softer setting, when changing from short-stroke operation to long-stroke operation, within a longer transition time period of, for example, 0.20 seconds to 0.25 seconds.

To make the transition smooth, but nevertheless quick, it may be advantageous to configure and/or control the adjustment actuator to provide for a non-constant transition speed and/or to operate at a non-constant speed over the transition time period, wherein, for example, the transition speed may be reduced at an initial phase and/or at an end phase of the transition, whereas transition speed may be increased at a medium phase of the transition.

So as to allow for easy, but nevertheless precise control, the adjustment actuator may be under control of an electronic control unit and/or responsive to electronic control commands.

For example, the adjustment actuator may include an electric motor which may displace an adjustment element such as a spring bearing of a spring element influencing stiffness of the movable working head and/or a range limiter, wherein a gearing may be provided between said electric motor and the adjustment element to transmit the drive motion of the electric motor to the adjustment element. Such electric motor, which may be combined with a gear box, allows for easy and precise control of the adjustment action and, at the same time, easy variation of the transition speed.

In addition or in the alternative, the adjustment actuator also may include a smart material changing a material property to control the adjustment, when subject to a control signal and/or subject to predefined ambient conditions.

For example, the adjustment actuator may include a smart fluid changing its viscosity when subject to a magnetic field and/or an electric field, wherein such smart fluid may cooperate with an adjustment element to change the displacement resistance thereof.

In addition or in the alternative, the adjustment actuator may include a smart metal such as a bimetal changing its shape when subject to heating and/or cooling.

The adjustment actuator may change various treatment characteristics. In particular, adaptivity of the working head and/or of a working head element may be adjusted, for example movability of the working head relative to the handle and/or movability of the working head element relative to a working head base to allow adaption of the personal care device to the body surface to be treated. More particularly, rotatory and/or linear stiffness and/or rotatory and/or linear displacement range of the working head and/or of a working head element may be adjusted by the adjustment actuator.

The personal care device may include a main drive unit for driving a main functional aggregate such as a drive motor for driving cutting tools of, for example a shaver. The adjustment actuator may be different from and/or additional to such main drive unit.

For example, the working head of the personal care device may be movably supported relative to the handle thereof and/or include a working head element being movably supported relative to a working head base to allow adaption of the working head and/or the working head element to the body surface contour, wherein the at least one adjustment actuator may adjust rotatory and/or linear displacement stiffness of said working head and/or the working head element. More particularly, the adjustment actuator may be configured for varying the moving resistance of the movable working head and/or of the movable working head element in dependency of the moving speed and/or of angular and/or linear position of the working head and/or the working head element. Moving speed is here to be understood as the velocity, linear or rotatorily, of the working head element relative to the working head or of the working head relative to the handle of the device. Accordingly, the moving resistance is about forces or torques of this relative movement between different parts of the device. For example, the graph defining the relationship between the force and/or torque necessary to move the working head and/or the working head element, and the moving speed can be varied by means of said actuator so as to, for example, increase or decrease the force and/or torque necessary to move the working head and/or the working head element at a certain speed relative to the handle/the working head base. For example, when the working head is suspended in a tilting and/or swiveling manner, the force and/or torque necessary to tilt and/or swivel the working head at a certain rotatory speed may be increased or decreased to achieve a higher or lower rotatory stiffness, wherein different rotatory stiffnesses may be provided for different rotatory speeds.

More particularly, the adjustment actuator for varying the moving resistance depending on moving speed as mentioned above or for varying the force or torque of the moveability of the working head or a working head element may be configured to adjust and/or vary the shape of the graph defining moving resistance over moving speed (or force or torque to be applied for movability) of the working head and/or working head element, wherein for example, the adjustment actuator may be configured to vary the curvature of such graph and/or to vary the shape of such graph from linear to non-linear and/or to vary the ratio of linear portions to non-linear portions and/or to vary the steepness of certain portions.

Such adjustment actuator for varying the moving resistance depending on moving speed may include a viscose type of friction device which may include a fluid pusher to push away a viscose fluid when moving. To adjust the moving resistance, a smart viscose fluid may be used which is configured to change its viscosity when subject to a magnetic field and/or electric field or voltage to allow for quick changes of viscosity to allow for adjustments within the current shave situation.

Such viscose friction device may provide for a moving resistance increasing with moving speed.

More particularly, such viscose friction device may include an adjustable damper configured to provide varying damping forces.

According to a still further aspect, at least one adjustment actuator may be provided for varying the shape of a graph defining the restoring force and/or restoring torque of a restoring device over rotatory and/or linear displacement of the working head and/or working head element from a linear shape to a curved shape and/or the ratio of linear portions to non-linear portions of said graph.

More particularly, the restoring device for urging the working head and/or the working head element towards a desired neutral position may include at least one leaf spring connected to the working head and/or the working head element, wherein the adjustment actuator may be configured to change the effective length of such leaf spring.

DETAILED DESCRIPTION OF THE INVENTION

Figure 1:
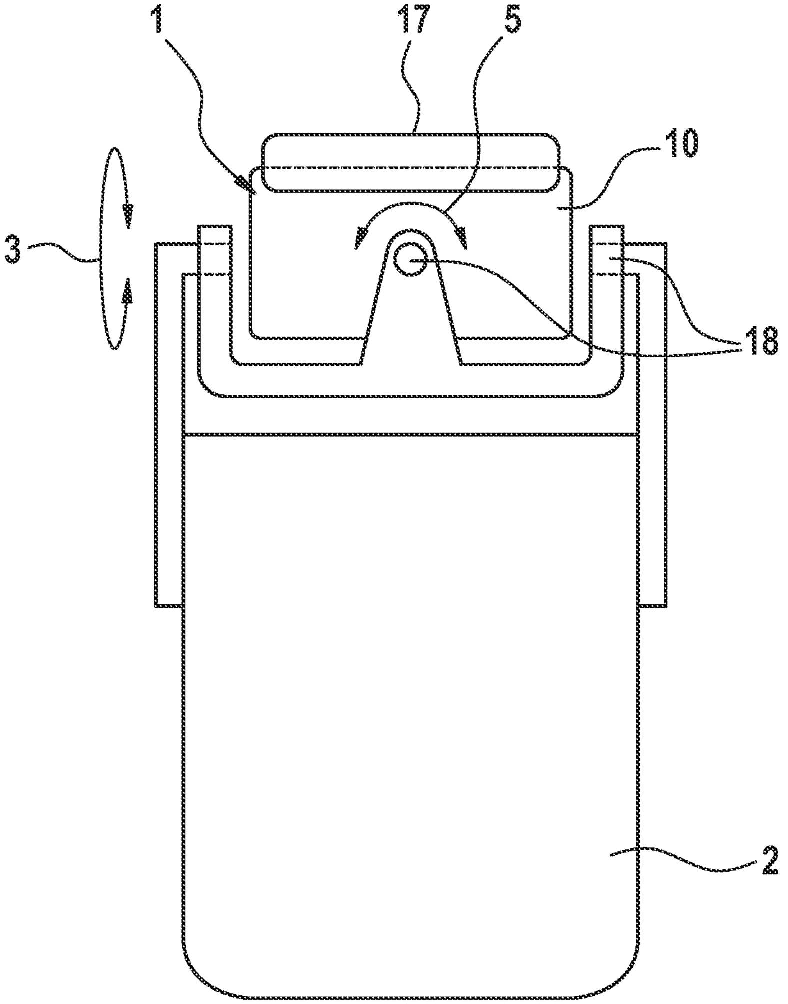
FIG. 1: a front view of a personal care device in terms of an electric shaver including a working head suspended to allow tilting and swiveling of the working head relative to the handle of the personal care device about a tilt axis and a swivel axis.

As becomes apparent from the Figures, it is suggested to provide for an adjustment actuator which is configured and controlled to achieve a smooth transition between different settings of the treatment characteristics. More particularly, the adjustment actuator may be configured and controlled to adjust the treatment characteristic from a first setting to a second setting within a time period of not less than 0.1 seconds and not more than 1.5 seconds. Advantageously, the adjustment actuator may be configured and controlled to achieve transition between the two settings within a time period of not less than 0.15 seconds and not more than 0.5 seconds or a transition time period of not less than 0.15 seconds and not more than 0.25 seconds.

To achieve the desired smooth transitions between different settings of the treatment characteristics, the adjustment actuator is operated with a limited change rate so the transition from one state such as “soft” to another one such as “hard” happens within a well-defined time duration. On the one hand, transition should not be too fast because immediate changes could disturb the user. On the other hand, the transition should be fast enough to get the setting of the treatment characteristic much with variations of the treatment region and/or variations of the way of using the personal care device such as changing from short strokes to long strokes.

When the personal care device is moved along the body surface in a reciprocating way, the adjustment actuator may be configured and controlled to effect the transition from a first setting to a second setting of the treatment characteristics within one or two strokes.

The adjustment actuator may be configured to allow operation at different speeds, wherein a control unit for controlling the adjustment actuator may be configured to vary the transition time spent for effecting the adjustment, i.e. transition from a first setting to a second setting depending on user habits and/or preferences and/or operational situations. For example, when changing from long stroke use to short stroke use, it may be advantageous to effect transition from, for example, a softer working head configuration to a harder working head configuration within a shorter transition time of, for example, 0.15 to 0.20 seconds, whereas, on the other hand, it may be advantageous to effect transition from the harder setting to the softer setting, when changing from short-stroke operation to long-stroke operation, within a longer transition time period of, for example, 0.20 seconds to 0.25 seconds.

To make the transition smooth, but nevertheless quick, it may be advantageous to configure and/or control the adjustment actuator to provide for a non-constant transition speed and/or to operate at a non-constant speed over the transition time period, wherein, for example, the transition speed may be reduced at an initial phase and/or at an end phase of the transition, whereas transition speed may be increased at a medium phase of the transition.

For the user, several advantages are related to well controlled change of the described states:

The behavior of the device appears less nervous compared to a device with an actuator that looks and feels like jumping.

The velocity of the actuator may even be adapted to the behavior of the specific user, as it may have been recorded by sensors and learned by an algorithm during a treatment. An example for such a quantity may be the amount of strokes per unit of time or the average velocity of the personal care device over the body surface.

The characteristic of the device changes smoothly and the user does not feel the process of the change itself, but only the new device adjustment.

If the movement of the adjustment actuator is related to a movement, in particular a contour adaption movement such as swiveling of the working head and/or an element thereof, a slow actuation avoids any sudden movement and as a result a non-desirable mechanical impact onto the skin.

Any unexpected shake of the handle during any sudden fast actuation can be avoided.

An actuator with limited speed can be built up with lower power compared to a very fast actuator. Since volume and power of an engine are strongly correlated, the device, in particular its handle can be built smaller and with a more attractive design.

Several advantages and simplifications also can be found for the actuator if a considerable time is allowed for a movement to a new position.

It may need less driving power, e.g. at a given voltage less electrical current, because the actuator may deliver some mechanical energy during its movement. When the actuator has more time for its movement, the needed power is less for achieving the same total mechanical energy.

A slower/smaller actuator can be cheaper than a fast, strong and big one

A slower actuator leads to less force needed to accelerate the involved parts. This translates into less wear in the mechanics So as to allow for easy, but nevertheless precise control, the adjustment actuator may be under control of an electronic control unit and/or responsive to electronic control commands.

For example, the adjustment actuator may include an electric motor which may displace an adjustment element such as a spring bearing of a spring element influencing stiffness of the movable working head and/or a range limiter, wherein a gearing may be provided between said electric motor and the adjustment element to transmit the drive motion of the electric motor to the adjustment element. Such electric motor, which may be combined with a gear box, allows for easy and precise control of the adjustment action and, at the same time, easy variation of the transition speed.

In addition or in the alternative, the adjustment actuator also may include a smart material changing a material property to control the adjustment, when subject to a control signal and/or subject to predefined ambient conditions.

For example, the adjustment actuator may include a smart fluid changing its viscosity when subject to a magnetic field and/or an electric field, wherein such smart fluid may cooperate with an adjustment element to change the displacement resistance thereof. Such adjustment actuator may be provided for varying the moving resistance depending on moving speed and/or may include a viscose type of friction device which may include a fluid pusher to push away a viscose fluid when moving. To adjust the moving resistance, a smart viscose fluid may be used which is configured to change its viscosity when subject to a magnetic field and/or electric current to allow for quick changes of viscosity to allow for adjustments during one round of personal care treatment. Such viscose friction device may provide for a moving resistance increasing with moving speed. More particularly, such viscose friction device may include an adjustable damper configured to provide varying damping forces.

In addition or in the alternative, the adjustment actuator may include a smart metal such as a bimetal changing its shape when subject to heating and/or cooling.

According to another aspect, at least one adjustment actuator may be provided for varying a breaking resistance counteracting and/or braking movement of the working head and/or the working head element irrespective of the direction thereof. Contrary to biasing devices such as preloading springs urging the working head towards a certain position, such braking resistance counteracts and/or brakes the working head and/or working head element moving in either direction. In other words, the direction of the braking force changes with the direction of the movement of the working head and/or working head element to always counteract such movements.

In addition or in the alternative, the adjustment device may include a restoring for urging the working head and/or the working head element towards a desired neutral position, wherein such restoring device may include at least one spring element such as a leaf spring connected to the working head and/or the working head element, wherein the adjustment actuator may be configured to change the effective length of such leaf spring.

As can be seen from FIG. 1, the personal care device 20 includes an elongated handle 2 to be gripped by the fingers of a user to move the personal care device 20 along a body surface to be treated. Said handle 2 may form a housing in which functional and/or structural parts of the personal care device 20 may be accommodated, for example an energy storage such as a battery, a drive motor and/or a control unit for controlling the function such as a microprocessor with a program storage connected thereto.

A working head 1 supported on said handle 2 includes one or more working head elements 7 for performing the care treatment. In case of a shaver which is illustrated in the figures, said working head element 7 may include hair cutting elements such as shear foil cartridges and/or a rake-like trimmer, cf. FIG. 2.

The working head element 7 may define a skin contact surface 17 of the working head 1, wherein said skin contact surface 17 may extend substantially perpendicular to a longitudinal axis of the handle 2 or inclined thereto, depending on the rotatory position of the working head 1. For example, the skin contact surface 17 may be formed by a distal end side of the working head 1.

Figure 2:
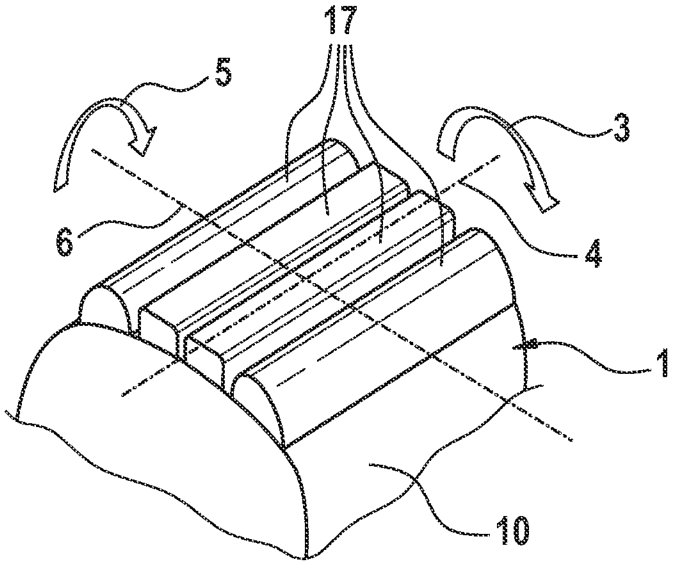
FIG. 2: a partial perspective view of the working head of the personal care device of FIG. 1, wherein partial view a illustrates the orientation of the swivel axis and the tilt axis of the working head relative to the skin contact surface thereof and partial view b illustrates the linear displacement axis of a working head element of the working head in terms of a diving axis allowing for diving of the working head element relative to the working head base.
Figure 2:
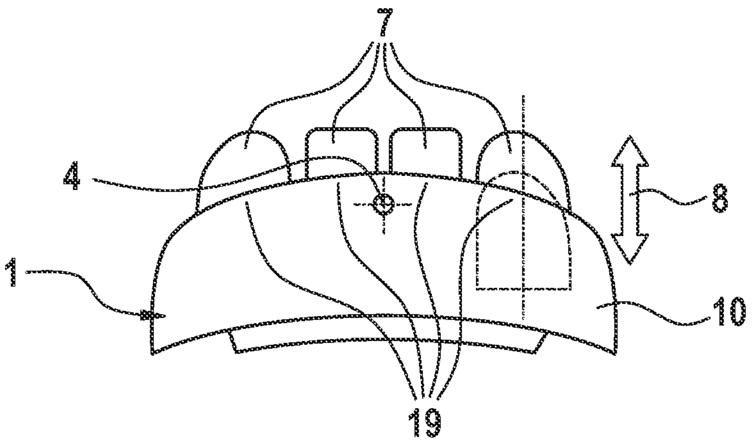

As illustrated by FIGS. 1 and 2, the working head 1 may be supported on the handle 2, by means of a suspension 18, in a movable manner so that the working head 1 may be rotated and/or linearly displaced relative to the handle 2. For example, the suspension 18 may allow for swiveling 3 of the working head 1 about a swivel axis 4, cf. FIG. 2, and/or tilting 5 of the working head 1 about a tilt axis 6. Said swivel and tilt axes 4 and 6 may extend substantially perpendicular to each other and/or substantially parallel to the aforementioned skin contact surface 17, cf. FIG. 2.

In addition or in the alternative to such rotatory movability, the working head 1 also may be linearly displaced relative to the handle 2, for example along a displacement axis substantially parallel to the longitudinal axis of the handle 2 so that the working head 1, as a whole, may dive or float when the skin contact surface 17 is pressed against the body surface.

In addition or in the alternative to the movability of the working head 1 as a whole, one or more working heads 7 such as the aforementioned shear foil cartridges, may be movably supported relative to a working head base 10 by means of a suspension 19. The working head base 10 may form a frame-like structure which may swivel and/or tilt relative to the handle 2 in the aforementioned manner so that the additional movability of the working head element 7 may be superposed to the movability of the working head base 10.

For example, the working head elements 7 may be linearly displaced along a displacement axis 8 which may extend substantially perpendicular to the skin contact surface 17 so that the working head element 7 may dive or float when subject to skin contact pressure. In addition or in the alternative to such linear diving, the suspension 19 of the working head element 7 also may allow for rotatory movements of the working head elements 7 relative to the working head base 10 to allow for adaption of the working head element 7 to the skin contour. In particular, the working head element 7 may tilt along a tilt axis parallel to tilt axis 6 of working head 1.

The adaptive movements of the working head 1 and/or the working head element 7 to the skin contour may be controlled by an adaption controller 24 which may include one or more mechanisms and/or actuators and/or mechanical controllers to influence one or more of the aforementioned movements.

Figure 3:
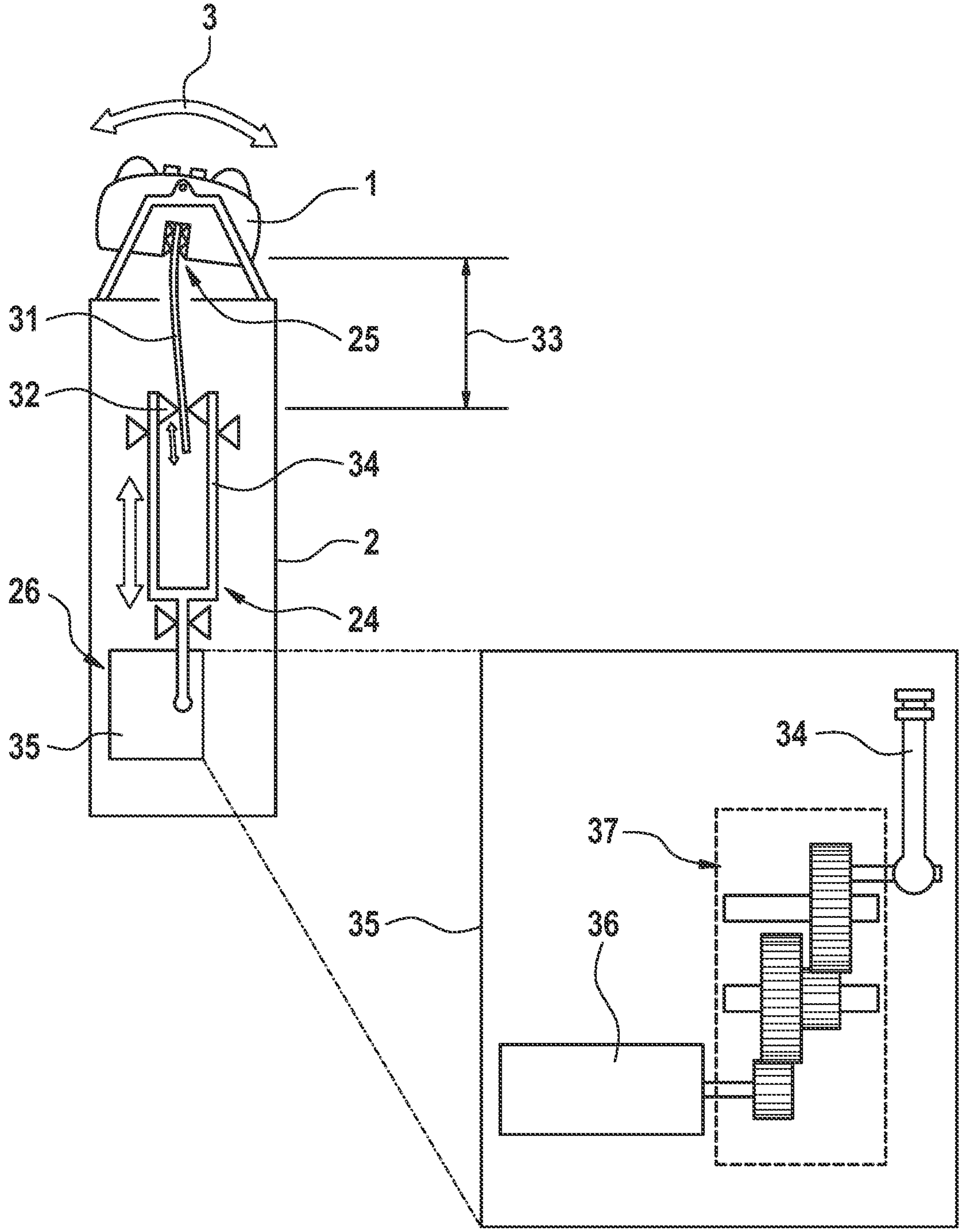
FIG. 3: a sectional side view of an embodiment of the personal care device of the preceding figures, illustrating a restoring device for restoring the working head towards a neutral swiveling position, wherein such restoring device includes a leaf spring and the adjustment actuator for adjusting the restoring characteristic is configured to vary the effective length of the leaf spring.

For example, as shown by FIG. 3, the adaption controller 24 may include a restoring device 25 applying a restoring force and/or torque onto the working head 1 to urge the working head 1 towards a neutral or starting position which may be an intermediate position from which the working head 1 may move into opposite directions. Alternatively, the neutral or start position may be an end position at the swivel or tilt range. For example, the restoring device 25 may be configured to urge the working head 1 into a neutral swivel position about swivel axis 4.

Said restoring device 25 may include a leaf spring 31 connected or rigidly fixed to the working head base 10 in a way such that swivel 3 of the working head 1 causes the leaf spring 31 to pivot and thus, bend. As can be seen from FIG. 5, leaf spring 31 is also connected to the handle 2 or a structural element fixed to said handle 2, by means of a spring bearing 32 which limits rotatory movements of the leaf spring 31 due to swiveling of the working head 1.

So as to adjust the restoring force and/or restoring torque of the leaf spring 31, the effective length 33 of the leaf spring 31 may be adjusted, wherein, for example, the aforementioned spring bearing 32 may be displaced in a direction substantially parallel to the longitudinal axis of the leaf spring 31. For example, the spring bearing 32 may be displaced in a direction parallel to the longitudinal axis of the handle 2, cf. FIG. 5, to change the effective length 33 of leaf spring 31.

Displacement of the spring bearing 32 may be effected by means of an adjustment actuator 35 which can be controlled by the aforementioned control unit. For example, said actuator 35 may include a motor 36 such as an electric motor which is connected to the displaceable spring bearing 32 via a drive train or connector or transmitter 34 transmitting the drive movement of the motor 36 to the spring bearing 32. Said motor 36 may be a DC motor.

For example, a gearing 37 may be provided between a drive shaft of motor 36 and transmitter 34 so as to transform, for example, a rotatory drive shaft movement into a substantially linear displacement of the spring bearing 32.

Advantageously, the change rate of the active element in terms of said displaceable spring bearing 32 can be understood as a velocity of some actuator mechanics. It may move from one position to another one within a transition time duration that is not perceived as a sudden disturbing movement.

Figure 4A:
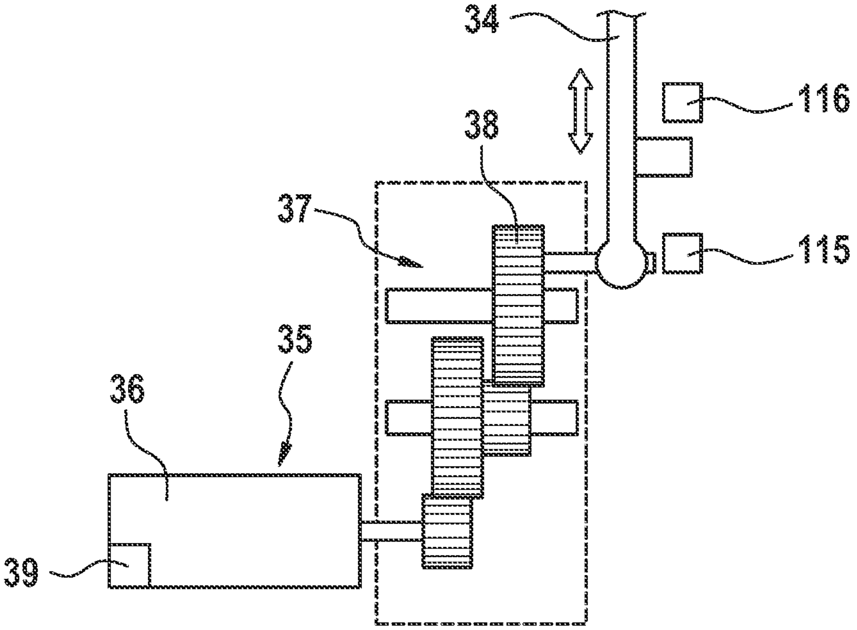
FIG. 4*a*-4*b*: an adjustment actuator similar to FIG. 3, including an electric motor and a gearing for displacing an adjustment element, wherein partial view a) shows front view of the entire gearing including the motor and the adjustment element driven thereby and partial view b) shows a side view of the adjustment element driven by the output gear of the gearing and a pair of end switches for detecting the position of the adjustment element.
Figure 4B:
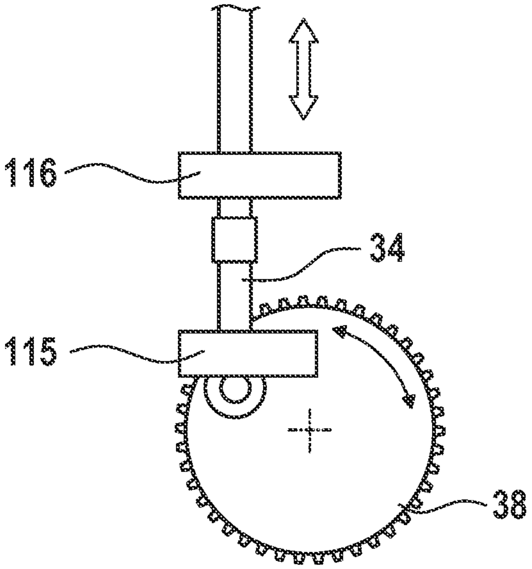

As can be seen from FIG. 4*a*, an electronic control unit 39, which may include a microprocessor and a storage unit for storing a control software, may drives said motor 36 via suitable power electronics.

The combination of controller and suitable electronics may be built up in a way that it can drive the motor 36 in both directions and with variable speed. Many solutions for such a set-up exist, such as the use of a so-called H-bridge drivers and of pulse width modulated motor voltage.

The motor current may be measured by the controller. This can be done via a shunt resistor, i.e. a resistor that the motor current flows through and the measurement of the voltage across this resistor.

The gearing 37 may be built up with cogwheels. The gearing could be built up differently as well, e.g. it may include a worm gear, cf. FIG. 5, or a gearing of the type harmonic drive. By at least one of those gearings, it may be possible to prevent movement without actuation which allows self-blocking of the gearing.

Figure 5:
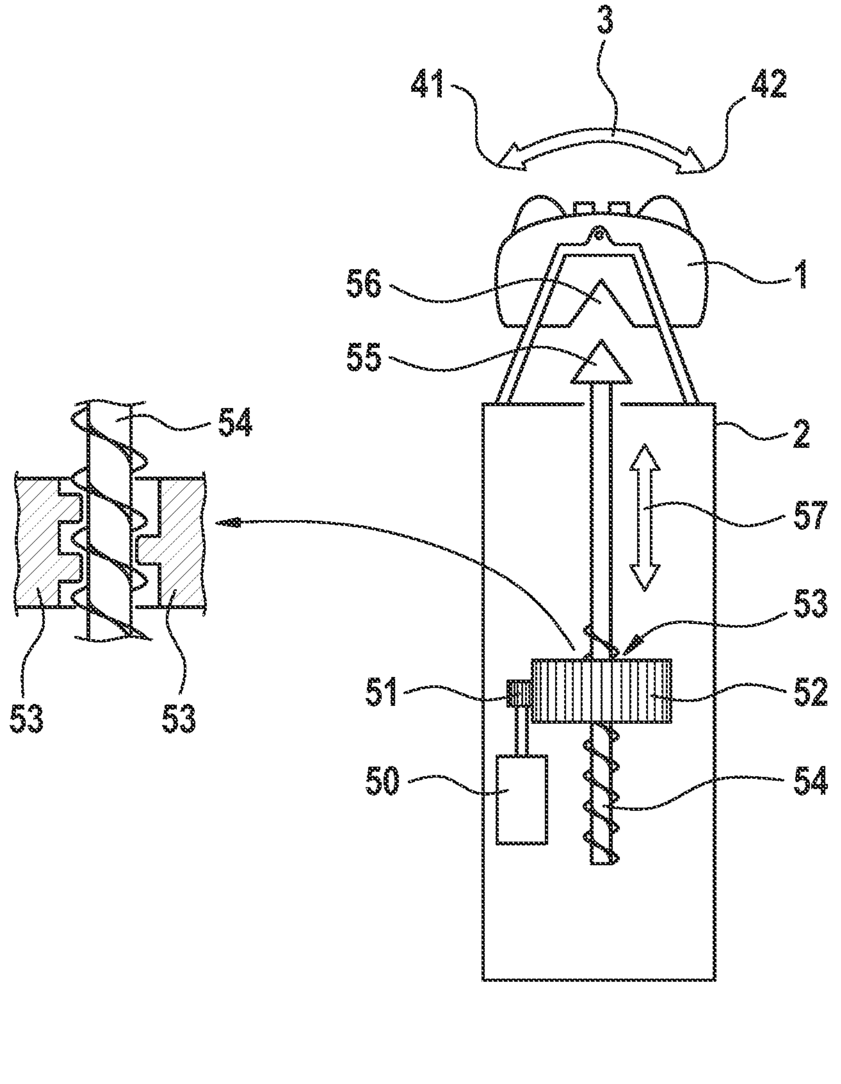
FIG. 5: a sectional side view of another embodiment of the personal care device of the FIGS. 1 and 2, illustrating the adjustment actuator for adjusting the swiveling range.

The last stage 38 of the gearing may drive a transmitter such as a lever 34 that is attached to some connector such as the spring bearing 32 or more generally, an element that is able to adjust a property of the head such as the range limiter shown in FIG. 5. The element also could be a spring, attached to some point at the pivotable head and adjusting its stiffness against rotations.

Different states and positions of the lever 34 correspond to different values of the head stiffness. The positions of the lever 34 include 2 end positions, a lower position and an upper position, and may include further positions in-between.

Advantageously, the adjustment actuator may be stopped and held at various positions including at least one intermediate position between two end positions to allow for fine adjustment. More particularly, the adjustment actuator may be continuously and/or step-by-step operated and stopped at various desired positions to provide for continuous and/or step-by-step adaption of the treatment characteristic.

The lower position may be used for adjusting the head to low stiffness and the upper position may be used for adjusting the head to high stiffness, cf. FIG. 3.

A detection device may be provided for detecting the end positions of the lever 34, wherein said detection device may include one or more of the following:

- end switches 115, 116 at the lower and the upper position.
- a lower and an upper mechanical limit for the lever 34, wherein, when the lever reaches such a limit, a force may build up which then leads to an increased torque and increased current in the motor 36. The increased current can be measured via the previously mentioned shunt resistor.
- A position sensor for detecting the end positions and/or intermediate positions.

For driving the lever 34 to one of the end positions, the controller may drive the motor in the corresponding direction until the end position is detected.

For driving the lever 34 from an end position to an intermediate position, the controller drives the motor for a defined amount of time into the desired direction. The defined amount of time is derived from the needed movement distance and the velocity of the lever. This velocity can be assumed as constant or, for more accuracy, it can be estimated via the motor current. Higher current corresponds to lower motor velocity.

For even more improving the smoothness of the transition between the states, the controller increases the speed of the motor 36 with a defined rate at the beginning of the motion and also slows down the motor with a defined rate at the end. Any sudden starting or stopping of the motor 36 is avoided in this way.

Figure 8:
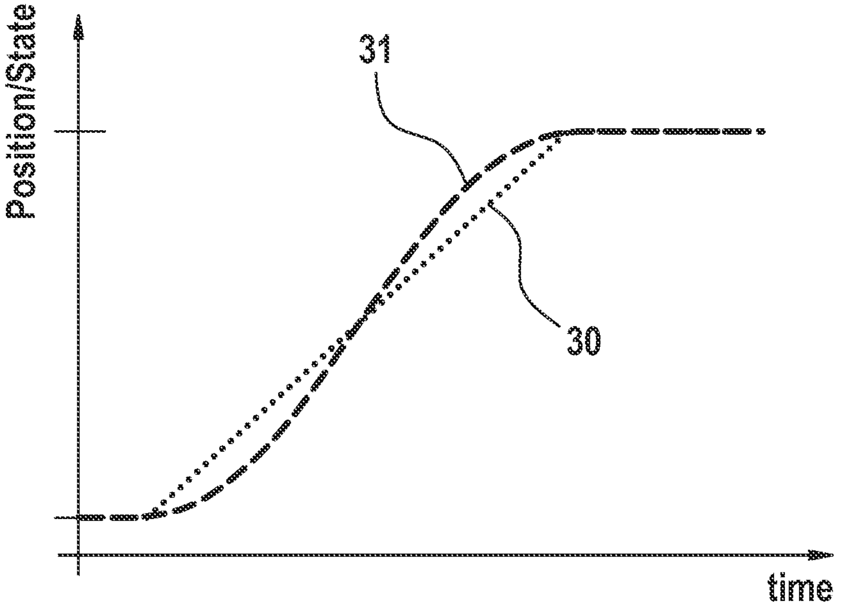
FIG. 8: a functional diagram showing the position/state of an actuation element versus time, wherein a linear transition and a non-linear transition between two states are illustrated.

While a transition with constant speed corresponds to the curve 30 of FIG. 8, an even smoother transition with defined rate of speed increase corresponds to curve 31, cf. FIG. 8, wherein the slope of the curve 31 changes gradually rather than in steps. For determining the position of the lever 34 in intermediate positions, the non-constant, but variable speed may be taken into account.

As shown by FIG. 3, the restoring device 35 may be configured such that the aforementioned leaf spring 31 is undeflected and/or straight when the working head 1 is in its neutral position. Thus, no torque and/or restoring force is applied to working head 1 when the latter is in its neutral position. In other words, when starting displacement of the working head 1 out of its neutral position, substantially no torque and/or force is necessary so swiveling 3 may start at substantially zero resistance at the neutral position.

Depending on the configuration of the restoring device 25, different restoring characteristics may be provided. For example, the swiveling and/or tilting torque may increase with increasing swivel and/or tilt angles in a non-linear way. The larger the swivel or tilt angle gets, the steeper the torque increase may become. When the effective length 33 is reduced, the rotation stiffness increases, whereas increasing the effective length 33 leads to a reduced rotation stiffness. The torque characteristic also may be a linear one, wherein the resistive and/or restoring torque may linearly increase with an increasing swivel or tilt angle. Again, swivel or tilt stiffness may be adjusted also in case of a linear characteristic.

Also for linear displacements of the working head 1 and/or the working head element 7, such as the diving movements 8 as shown by FIG. 2, different force characteristics may be provided. For example, a restoring device including a leaf spring similar as the restoring device 25 may be employed, wherein for example the leaf spring, with its longitudinal axis, may be arranged transverse to the diving axis 8 to be deflected when the working head element dives. Again, adjusting diving stiffness may be achieved by increasing and/or decreasing the effective length of such leaf spring. In addition or in the alternative, other restoring devices including other types of springs such as a compression spring may be used to influence the diving characteristics, wherein for example the spring bearing may be displaced along the axis of compression.

Figure 6:
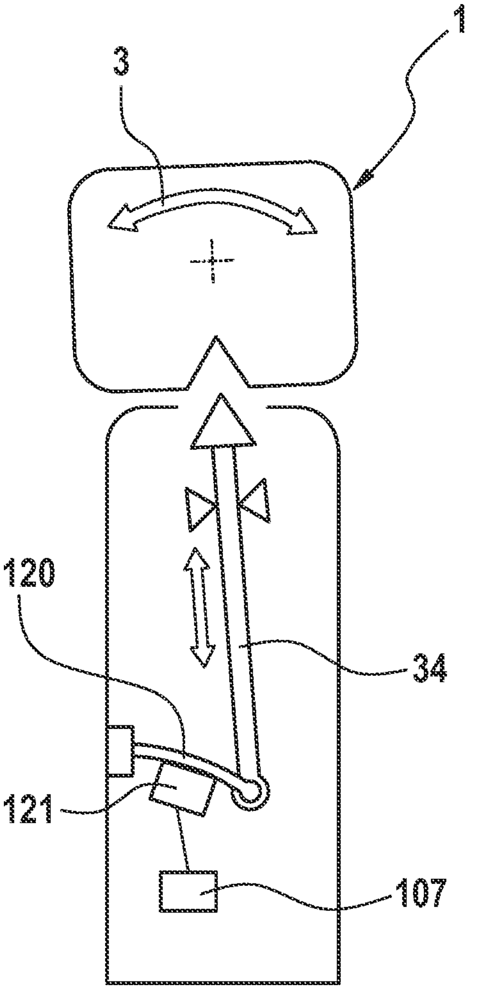
FIG. 6: a sectional side view of the personal care device having a swiveling range limiter similar to FIG. 5, wherein the adjustment actuator includes a smart material actuation element in terms of a bimetal bar changing its shape when subject to heating and cooling.
Figure 7:
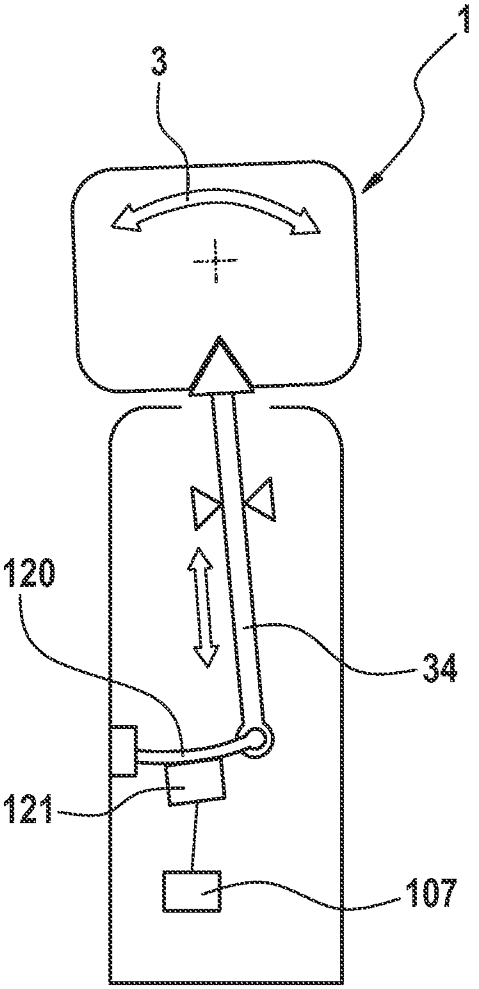
FIG. 7: a sectional side view of the personal care device of FIG. 6, wherein the bimetal bar of the smart material actuator is shown in a different configuration after having been subject to heating.

As shown by FIGS. 5 to 7, contour adaption movements of the working head 1 also may be controlled by a displacement range limiter 58 which may limit the available maximum rotatory and/or linear displacement.

For example, as shown by FIG. 5, the displacement range limiter 58 may limit the maximum swiveling 3 of working head 1.

In this embodiment, an actuator 50 . . . 54 is used to push a wedge 55 into a gap 56 at the bottom of the shaving head 1. Depending on the extent how far the actuator moves the wedge into the gap along the direction 57, the swivel range is more or less limited. In the lower position of the wedge 55, the swivel rotation has a wide range. With upward moving wedge, the range becomes smaller until the swivel rotation is completely blocked when the wedge is moved to its upper mechanical limit. The head is then forced into a predefined position. In detail, the adjustment actuator may work as follows: a motor 50 such as a DC-motor may turn a gear 51, which drives a second gear 52. This gear 52 contains an internal thread 53 and is placed on a threaded rod 54.

The threaded rod is moved up and down, as soon as the motor 50 turns. In summary, the minimum-41 and maximum-42 angles of the head swiveling can be adjusted with the help of the motor 50. Advantageously, the motor 50 may be stopped and held at intermediate positions to define intermediate rotatory displacement ranges smaller than the maximum range and larger than the minimum range (which may be zero or larger than zero).

As can be seen from FIGS. 6 and 7, the adjustment actuator may include a smart material such as a bimetal strip or bar for effecting the adjustment movement of the adjustment element.

Basically, different types of smart materials may be used for implementing the adjustment actuator, such as materials changing their properties under the influence of ambient conditions, such as temperature, electric field, magnetic field, light and/or chemistry.

For example, a setup with a material that changes shape with temperature is described.

A piece 120 of material that bends differently, depending on the temperature may be chosen. This can be a piece of bimetal.

As shown by FIG. 6, such piece 120 may be a rod or bar and/or may be rigidly supported at one end to allow for bending and/or deflection and thus, movement of the other end. As shown by FIG. 6, the smart material, in a first configuration, may bend in a way that it holds the lever 34 in its lower position.

Some heating means such as an electrical resistor 121 may be activated to apply heating to the bimetal piece 120, wherein an electrical current may be forced to flow through the resistor. By adjusting the current via the control unit 39, the temperature of the piece 120 of smart materials is adjusted to a defined value. As a result, the bending changes to a shape that is related to the temperature.

A maximum current and maximum temperature moves the lever 34 to the upper position (FIG. 7) and smaller amounts of heating move it to intermediate positions.

For the way to the upper position, the limited velocity is obtained by the heat capacitance of the piece of smart material and the power that is used to heat it up. So, it just needs time to get heated up. For the way to the lower position, the limited velocity is obtained by the combination of the heat capacitance and the cooling that the piece of smart material experiences in its surrounding.

Figure 9:
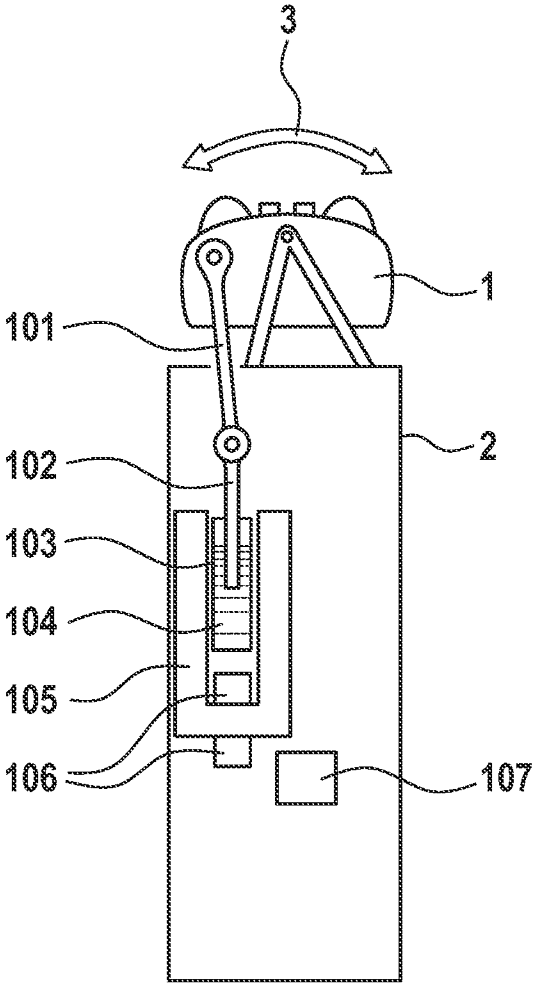
FIG. 9: a sectional side view of a personal care device having an adjustment actuator including a smart material in terms of a smart fluid changing its viscosity upon subject to an electric current through a coil and a magnetic field respectively, to adjust the swiveling resistance of the working head.

Another example of a set-up with a smart material is shown by FIG. 9. In this case, the difference between different states of the mechanism is not a different position, but a difference in mechanical resistance or stiffness. Mechanical resistance may be understood as a quantity that relates the force that is needed to move a mechanical part with the velocity that is achieved by applying this force. It can also be understood as the ratio of such a force and such a velocity.

More particularly, as shown by FIG. 9, a viscose type of friction device 100 may include a fluid pusher for pushing a viscose fluid away when the working head 1 and/or working head element 7 moves to adapt to the body surface contour. To adjust the resistance of the fluid pusher in dependency of speed, a smart viscose fluid may be used which is configured to change its viscosity when subject to a magnetic field and/or subject to electric current.

More particularly, as shown by FIG. 9, a connecting rod 101 moves the element 102 up and down synchronously with the swivel rotation of the head. This element 102 acts as an inner damper element. This inner damper element is located inside the outer damping element 103. The space between inner and outer damping is filled with a magnetic liquid 104. The magnetic liquid is located between the poles of an electromagnet consisting of an iron core 105 and one or more coils 106. The viscosity of the magnetic liquid 104 is modified with the help of an electrical current through the coil(s) 106.

Depending on the current, the coil(s) generate a magnetic field in the volume of the magnetic liquid 104. The higher the magnetic field, the higher is the viscosity of the magnetic liquid. A higher level of damping is then perceived by the user when the head is swiveled. If the current through the coil 106 is lowered, the characteristics is modified towards the curve 31. In summary, the current through the coil 106 controls the torque, needed to swivel the head 1 with a specific rotation speed.

The strength of the field changing viscosity may be controlled by an electric control unit 107.

As a consequence, the mechanical resistance of the lever against vertical movements and as a second consequence also the resistance of the head 1 against rotations 3 is adjusted.

To achieve the before mentioned smooth transition between different states, the electrical field is controlled in such a way that it changes with a defined rate.

In summary, there is a relation between the rotation speed of the head 1 and the torque that is applied against this rotation. The electronic control 107 can adjust this relation in a way that the head can pivot more or less easily and the transition is not perceived as an unexpected sudden resistance.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. Personal care device comprising an elongated handle for manually moving the personal care device along a body surface, a working head attached to said handle, said working head having at least one working head element for effecting a personal care treatment to said body surface, wherein an adjustment device including at least one adjustment actuator is provided for adapting the working head and/or the working head element to a contour of the body surface, characterized in that said at least one adjustment actuator is configured and controlled to adjust a pivoting stiffness of the working head relative to the handle and/or a pivoting stiffness of the working head element relative to a working head base from a first setting to a second setting within a transition time period of not less than about 0.1 seconds and not more than about 1.5 seconds, wherein said at least one adjustment actuator is configured to vary the transition time period spent for effecting the adjustment of the pivoting stiffness in response to a user preference signal and/or in response to an operation change.

2. Personal care device comprising an elongated handle for manually moving the personal care device along a body surface, a working head attached to said handle, said working head having at least one working head element for effecting a personal care treatment to said body surface, wherein an adjustment device including at least one adjustment actuator is provided for adapting the working head and/or the working head element to a contour of the body surface, characterized in that said at least one adjustment actuator is configured and controlled to adjust a pivoting stiffness of the working head relative to the handle and/or a pivoting stiffness of the working head element relative to a working head base, wherein said at least one adjustment actuator is configured to vary a transition time period spent for effecting the adjustment of the pivoting stiffness in response to a user preference signal and/or in response to an operation change.

3. Personal care device according to claim 1, wherein said transition time period is not less than about 0.15 and not more than about 0.50 seconds.

4. Personal care device according to claim 1, wherein the at least one adjustment actuator is configured and controlled to adjust at a transition speed which is non-constant over the transition time period, wherein the transition speed is reduced at an initial phase and/or at an end phase of the transitional time period and/or increased at a medium phase of the transitional time period.

5. Personal care device according to claim 1, wherein said at least one adjustment actuator is under control of an electronic control unit configured to control a response time and/or the speed of said adjustment actuator to effect the adjustment to be within a desired adjustment time period.

6. Personal care device according to claim 1, wherein said at least one adjustment actuator is configured and controlled to be stopped and held at at least one intermediate position between two end positions to adjust to at least one intermediate setting in addition to first and second settings corresponding to the end positions.

7. Personal care device according to claim 1, wherein said at least one adjustment actuator includes an electric motor for displacing a displaceable adjustment element from a first position to a second position within said transition time period.

8. Personal care device according to claim 7, wherein said electric motor is connected to said adjustment element via a gearing.

9. Personal care device according to claim 7, wherein said electric motor is controlled to increase motor speed with a predefined rate at an initial phase and/or slow down motor speed at a predefined rate at an end phase so motor speed is reduced, in comparison to a medium phase of operation, at said initial phase and/or at said end phase.

10. Personal care device according to claim 1, wherein said at least one adjustment actuator includes a smart material actuation element changing a material property to control the adjustment, when subject to a control signal and/or a predefined ambient condition.

11. Personal care device according to claim 10, wherein said smart material actuation element includes a bimetal actuation element changing its shape upon subject to heating and/or cooling, wherein said bimetal actuation element is connected to an adjustment element via a transmitter so that changes in shape of the bimetal actuation element are transformed into displacement of the adjustment element.

12. Personal care device according to claim 1, wherein said smart material actuation element includes a smart fluid changing its viscosity when subject to a magnetic field and/or a field of electricity.

13. Personal care device according to claim 1, wherein said adjustment actuator includes a fluid pusher connected to the working head and/or the working head element for pushing away the smart viscose fluid when the working head and/or the working head element is moving, wherein said viscose fluid is a smart viscose fluid changing its viscosity depending on a magnetic field applied thereto, wherein the adjustment device includes a controller for changing said magnetic field.

14. Personal care device according to claim 1, wherein said adjustment device includes a displacement range limiter for limiting a maximum available rotatory and/or linear displacement of said working head and/or said working head element, wherein said displacement range limiter is adjustable by an adjustment actuator to change the available displacement range.

15. Personal care device according to claim 14, wherein said range limiter includes a pair of engagement elements, one of which is wedge-shaped and one of which is roof-shaped, wherein at least one of said engagement elements is movably supported to be moved towards and away from the other engagement element such that wedge-shaped contour may enter into the roof-shaped contour, wherein the adjustment actuator is configured to hold the engagement elements at varying distances from each other defining varying displacement ranges.

16. Personal care device according to claim 1, wherein the working head is configured to move in opposite directions from a neutral position.

17. Personal care device according to claim 1, wherein an operation change comprises a change from a long stroke operation to a short stroke operation or from a short stroke operation to a long stroke operation.

18. Personal care device according to claim 2, wherein an operation change comprises a change from a long stroke operation to a short stroke operation or from a short stroke operation to a long stroke operation.

19. Personal care device comprising an elongated handle for manually moving the personal care device along a body surface, a working head attached to said handle, said working head having at least one working head element for effecting a personal care treatment to said body surface, wherein an adjustment device including at least one adjustment actuator is provided for adapting the working head and/or the working head element to a contour of the body surface, characterized in that said adjustment actuator is configured and controlled to adjust the following characteristic: restoring force/torque urging the working head and/or the working head element towards a neutral tilt position relative to the handle depending on rotatory and/or linear displacement and/or moving speed of the working head and/or of the working head element, wherein the at least one adjustment actuator is configured and controlled to adjust at a transition speed which is non-constant over a transition time period, wherein the transition speed is reduced at an initial phase and/or at an end phase of the transitional time period and/or increased at a medium phase of the transitional time period.

20. Personal care device comprising an elongated handle for manually moving the personal care device along a body surface, a working head attached to said handle, said working head having at least one working head element for effecting a personal care treatment to said body surface, wherein an adjustment device including at least one adjustment actuator is provided for adapting the working head and/or the working head element to a contour of the body surface, characterized in that said at least one adjustment actuator is configured and controlled to adjust a restoring force/torque and/or a shape of a graph defining restoring force/torque over linear and/or rotatory displacement of the working head and/or the working head element and is further configured to adjust the restoring force/torque of a restoring device, wherein said restoring device includes a leaf spring connected to the working head and/or the working head element in a way to be deflected by contour adaption movements of the working head and/or the working head element, wherein the at least one adjustment actuator is configured to adjust an effective length of said leaf spring by displacing a spring bearing.

* * * * *